G. C. KENNEDY.
COLLAPSIBLE CARRIER FOR VEHICLES.
APPLICATION FILED NOV. 19, 1917.
1,294,673.
Patented Feb. 18, 1919.
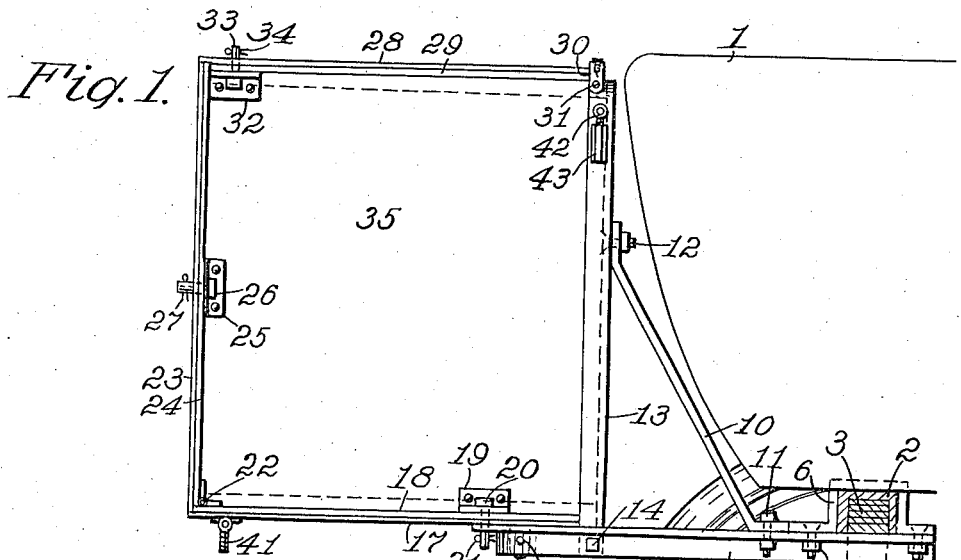
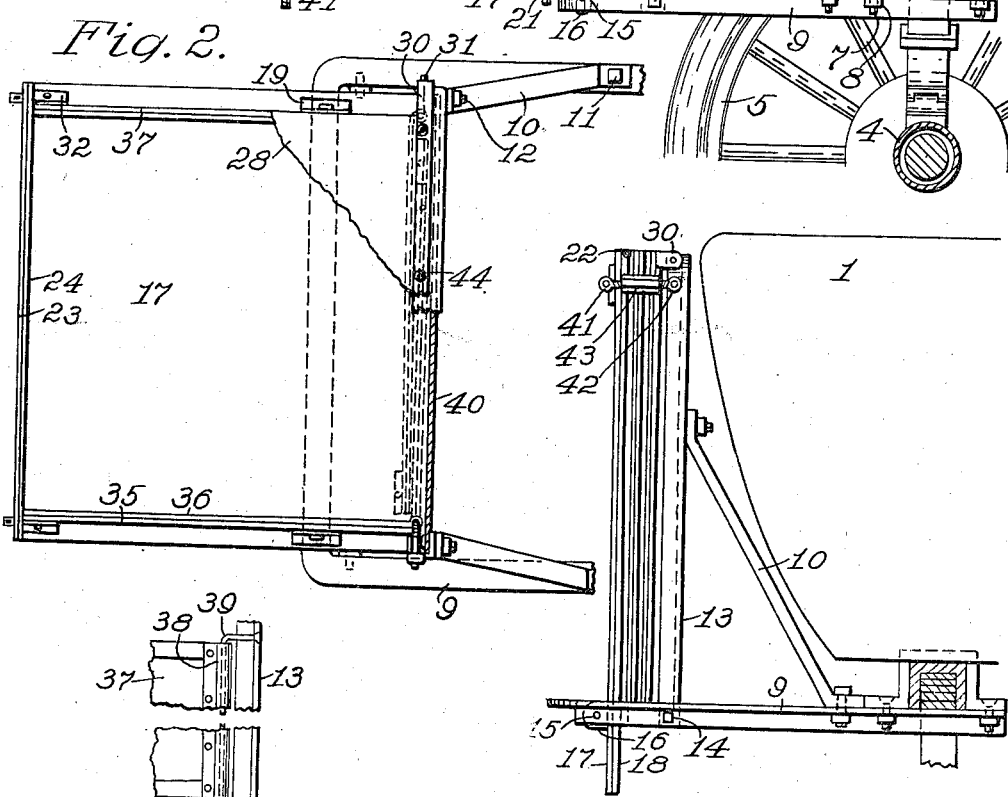
Inventor,
George Colvin Kennedy.

UNITED STATES PATENT OFFICE.

GEORGE COLVIN KENNEDY, OF WATERLOO, IOWA.

COLLAPSIBLE CARRIER FOR VEHICLES.

1,294,673.     Specification of Letters Patent.     Patented Feb. 18, 1919.

Application filed November 19, 1917. Serial No. 202,783.

*To all whom it may concern:*

Be it known that I, GEORGE COLVIN KENNEDY, a citizen of the United States of America, and a resident of Waterloo, Blackhawk county, Iowa, have invented certain new and useful Improvements in Collapsible Carriers for Vehicles, of which the following is a specification.

My invention relates to improvements in collapsible carriers for vehicles, and the object of my improvements is to supply a removable foldable receptacle adapted for attachment to a vehicle such as a motor-car, for occasional use in transporting goods and merchandise.

This object I have accomplished by the means which are hereinafter described and claimed, and which are illustrated in the accompanying drawings, in which Figure 1 is a side elevation of my collapsible carrier, as extended, and mounted on the rear of a motor-vehicle; Fig. 2 is a plan view of the same, with part of the closure-plate broken away, and dotted lines indicating the positions of the foldable parts when collapsed together; Fig. 3 is a side elevation, like that of Fig. 1, but showing the carrier collapsed, and Fig. 4 is a detail fragmentary view showing the hinge-connection between one of the swinging side-plates and one of the standards to which it is connected.

Similar numerals of reference denote corresponding parts throughout the several views.

In the drawings, the numeral 1 indicates the body of a motor-vehicle, whose chassis frame 2 is mounted in a well-known way on a transverse spring 3, the ends of the latter shackled to the ends of the axle-housing 4 of the rear carrying-wheels 5.

The main supporting-means for my improved carrier consists of a U-shaped bracket, formed from angle-bar 9 or other suitable section of beam. The ends of said bracket 9 are removably secured fixedly to the rear cross-bar 2 of the chassis-frame by means of a clamping-member 6, bolts 7 and nuts 8, or by any other suitable fastenings, while the bracket may be fixedly mounted on other parts of the frame if desired.

The numeral 13 denotes an inverted U-shaped standard which is positioned across the limbs of the U-shaped bracket 9 and has its lower ends fixed to the said limbs by means of bolts 14 or other means.

The numeral 10 denotes brace-bars whose extremities are fastened respectively to the standard 13 and the bracket 9 by means of bolts 12 and 11.

The numeral 40 denotes a front-plate secured across the limbs of the standard 13.

The hollow collapsible receptacle connected to and supported by said bracket and standard, is formed of said fixed front-plate, and other relatively movable plates to be now described. The bottom-plate 17 has reinforcing bars 18 secured on top along its side edges, and has depending hangers 16 with outwardly directed pintles 15 pivoted in orifices in the bracket limbs adjacent thereto. These pivotal connections are located considerably in advance of the cross-bar of said bracket, whereby the plate 17 is supported upon said cross-connection. The bracket flange, the overlying plate 17, and the bar 18 are orificed in registration to removably receive a headed pin 20, said pin also passing through an orifice in a flange of a plate 19 fixed on the outside of a side-plate 35, to secure all said parts fixedly together, the pin extremity being orificed to receive a split-key 21. As shown in Fig. 4, the two side-plates 35 and 37 are reinforced by longitudinal bars 36, and have vertical bars 38 secured along their rear ends provided with bearings for a rod 39 whose extremities are bent over and secured to the adjacent limbs of the standard 13. The side-plates swing over the bottom-plate 17 between the bars 18 on the latter which restrict their outward movement.

A back-plate 23 has side edge reinforcing bars 24, and hinges 22 connect the bars 24 to the bars 18 on the plate 17. Plates 25 on the outsides of the side-plates have orificed flanges to receive headed pins 26, the latter passing removably through the bars 24 and plate 23, and secured by means of split-keys 27.

A cover-closure plate 29 may or not be used as desired. It is reinforced by bars 28, and its front end is removably secured to a cross-bar 30 by means of screws 44, the extremities of the cross-bar being turned down over the standard limbs and pivoted on studs 31 thereon. The cover is shown imperforate, but when desired may be removed and a closure made of netting or other orificed material used, when it is desired to transport poultry or other things requiring ventilation. Flanged plates 32 are secured to the outsides of said side-plates and have headed pins 33 passed through orifices in their flanges and alined orifices in the bars 28 and plate 29 to secure the cover in place. Any other desired or suitable fastenings may be employed to releasably secure said plates together. When so extended into a hollow receptacle, the receptacle is rigid in its connections to each other and to the bracket and standard.

To collapse the receptacle, the fastening-means are released in turn to permit the cover to drop after the side-plates have been swung inwardly over each other, then the back-plate is folded over inwardly, and the bottom-plate together with the folded back-plate folded up against the other folded plates to the collapsed positions indicated in Fig. 3, compactly, and then secured together by the following means.

On studs projected respectively from the standard limbs and from the side-edges of the bottom-plate are pivoted threaded eye-bars 42 and 41, and these may be connected by means of turn-buckles 43, whereby the fastenings may be adjustably drawn together to compress the collapsed plates into a compact assemblage, preventing rattling under the jars of movement of the vehicle.

The device may be demounted easily, but ordinarily may remain in position on the vehicle, because of the small space occupied by it when collapsed together. Various changes may be effected in the device without departing from the principles or scope of protection of my invention.

Having described my invention, what I claim as new, and desire to secure by Letters Patent, is:

1. A device of the character described, comprising supporting means, a front-plate fixed to said supporting-means, a bottom-plate hinged to the supporting-means, a back-plate hinged to said bottom-plate, side-plates hinged to said supporting-means, and a top closure for the receptacle formed of said plates and hinged to said supporting-means.

2. A device of the character described, comprising arms fixedly mounted on a vehicle, standards fixedly erected on said arms, and a closed collapsible receptacle having parts respectively pivotally and rigidly connected to and supported by said arms and standards.

Signed at Waterloo, Iowa, this 15th day of November, 1917.

GEORGE COLVIN KENNEDY.